United States Patent [19]

Bravet et al.

[11] Patent Number: 5,296,303
[45] Date of Patent: Mar. 22, 1994

[54] PROCESS AND DEVICE FOR PRODUCING A PLASTIC LAYER OF HIGH OPTICAL QUALITY

[75] Inventors: Jean-Louis Bravet; Francois de Toytot, both of Thourotte; Gerd Leyens, Aache; Siegfried Pikhardt, Roetgen; Herbert Bayer, Aachen, all of France

[73] Assignee: Saint-Gobain Vitrage, Courbevoie, France

[21] Appl. No.: 528,325

[22] Filed: May 29, 1990

Related U.S. Application Data

[60] Continuation of Ser. No. 184,601, Apr. 8, 1988, abandoned, which is a division of Ser. No. 8,101, Jan. 20, 1987, Pat. No. 4,749,586, which is a continuation of Ser. No. 729,573, May 2, 1985, abandoned.

[30] Foreign Application Priority Data

May 2, 1984 [FR] France .................. 84 06782

[51] Int. Cl.⁵ .............................. B32B 17/10
[52] U.S. Cl. .................. 428/480; 428/411.1; 428/423.7
[58] Field of Search ............ 428/411.1, 423.7, 480

[56] References Cited

U.S. PATENT DOCUMENTS

| 3,147,137 | 9/1964 | Glass | 427/31 |
| 3,307,789 | 3/1967 | Clark | 427/426 |
| 4,623,592 | 11/1986 | Daude | 428/423.7 |

FOREIGN PATENT DOCUMENTS

| 0038760 | 10/1981 | European Pat. Off. |
| 0054491 | 6/1982 | European Pat. Off. |
| 2187719 | 1/1974 | France |
| 2134255 | 3/1974 | France |
| 2251608 | 6/1975 | France |
| 2398606 | 2/1979 | France |

*Primary Examiner*—Richard Bueker
*Attorney, Agent, or Firm*—Oblon, Spivak, McClelland, Maier & Neustadt

[57] ABSTRACT

A process for the continuous production of a plastic sheet of high optical quality capable of being used in laminated glasses, having at least a thin layer resistant to scoring and abrasion which entails high-speed centrifugal spraying of a mixture of reaction components, onto a plane horizontal support carried in a uniform movement of advancement relative to the spraying.

6 Claims, 3 Drawing Sheets

FIG_1

PROCESS AND DEVICE FOR PRODUCING A PLASTIC LAYER OF HIGH OPTICAL QUALITY

This application is a continuation of application Ser. No. 184,601, filed on Apr. 8, 1988, now abandoned, which was a divisional of Ser. No. 07/008,101, filed Jan. 20, 1987, now U.S. Pat. No. 4,749,586, which was a continuation of Ser. No. 06/729,573, filed May 2, 1985, now abandoned.

BACKGROUND OF THE INVENTION

1. Field of the Invention

The present invention relates to the production of a transparent plastic sheet of high optical quality having at least a layer exhibiting scoring resistance and abrasion resistance.

2. Description of the Background

Laminated safety glasses, used particularly as vehicle windshields, having a transparent rigid support of silicate glass, a plastic layer having energy-absorbing properties (EA layer) and a coating plastic layer having surface properties particularly of resistance to scoring or scratching and abrasion, called the inside protective layer (IP layer), have been described in French patents 2,134,255, 2,398,606, and also in European patent 0,054,491. The coating layer having the surface properties used in these laminated glasses is, for example, that described in French patents 2,187,719 and 2,251,608. This layer, referred to as self-healing, from which surface impressions spontaneously disappear after a short lapse of time, has, under normal temperature conditions, a high elastic deformation capacity, a slight modulus of elasticity, less than 2000 daN/cm2, and preferably less than 200 daN/cm2, and an elongation at break of more than 60% with less than 2% plastic deformation and preferably an elongation at break of more than 100% with less than 1% plastic deformation. Preferred layers of this type are thermosetting polyurethanes having a modulus of elasticity of about 25 to 200 daN/cm2 and an elongation of about 100 to 200% with less than 1% plastic deformation.

To produce the laminated glasses described above, a two-layer sheet is generally previously prepared by first, forming a thermosetting polyurethane layer by casting of the reaction mixture of the components on a casting support, and then polymerizing the monomers and forming a thermosetting layer with a thickness that can vary from 0.1 to 0.8 mm and forming on the first layer the second layer having energy-absorbing properties by casting of the reaction mixture of components or also by extrusion of a suitable resin that is already polymerized.

The reactive layer without solvent used to produce the thermosetting polyurethane layer requires, in order obtain a high optical quality, the production of a layer with a thickness greater than 0.1 Mm and preferably greater than 0.2 mm.

It has been found that a thinner layer of the order of some dozens of microns could still attain the required surface properties such as resistance to scoring and resistance to abrasion when this layer is used to coat another soft layer, as is the case for the laminated glasses described above where said layer with the surface properties is used to coat the EA layer.

Moreover, the production of such a thin layer would seem to be best effected by spraying with a spray gun inasmuch as this technique can deposit small amounts of deposited material. Unfortunately, spraying with a spray gun to form a thin layer is not a satisfactory technique as layers so produced are not of homogeneous thickness nor is the optical quality good. In particular, the optical quality is found to suffer from orange peel. This is believed to be due to the viscosity differential between the components forming the mixture to be sprayed. Although some attempts have been made to alleviate such drawbacks by using particular solvents or mixtures of solvents. However, these attempts have proven unsuccessful inasmuch as other problems arise from solvent evaporation.

Thus, a need continues to exist for a process for the continuous production of a plastic sheet which can be used in laminated glasses, said sheet having at least a thin layer of high optical quality and also having excellent resistance to scoring and abrasion.

SUMMARY OF THE INVENTION

Accordingly, it is an object of the present invention to provide a process for the continuous production of a plastic sheet having high optical quality which can be used in laminated glasses, said sheet having at least a thin layer of high optical quality.

It is also an object of this invention to provide a process for the continuous production of a plastic sheet having high optical quality which can be used in laminated glasses, said sheet having also excellent resistance to scoring and abrasion.

Moreover, it is also an object of the present invention to provide a device for the continuous production of a plastic sheet of high optical quality capable of being used in laminated glasses, which has high optical quality and excellent resistance to scoring and abrasion.

According to the present invention, the foregoing and other objects are attained by providing a process for the continuous production of a plastic sheet of high optical quality capable of being used in laminated glasses, having at least a thin layer resistant to scoring and abrasion, which entails high-speed centrifugal spraying of a mixture of reaction components onto a plane horizontal support which is carried in a uniform movement of advancement relative to the spraying.

BRIEF DESCRIPTION OF THE DRAWINGS

Other objects, features and attendant advantages of the present invention will be more fully appreciated as the same becomes better understood from the following detailed descriptions when considered in connection with the accompanying drawing(s) in which like reference characters designate like or corresponding parts and wherein.

DETAILED DESCRIPTION OF THE PREFERRED EMBODIMENTS

The present invention provides a process for the continuous production of a plastic sheet which can be used advantageously in laminated glasses. The plastic sheet has at least a thin layer of material of high optical quality.

According to the present invention, this layer is obtained by high-speed spraying of a mixture of reaction components on a horizontal plane support carried in an advancement movement that is uniform relative to the spraying, followed by a treatment assuring polymerization of the layer.

The centrifugal spraying used according to the invention is advantageously performed with a spray head such as a bowl revolving at a speed between about 1000 and 80,000 rpm.

According to one aspect of the invention, the plastic sheet is essentially formed by the layer obtained by spraying. For this purpose, a continuous horizontal plane support is used whose surface partially adheres to the material able to form tile layer so that the movement of the support causes carrying of the material. The support is given a relative uniform advancement movement and the mixture of reaction components is sprayed on the support by high-speed centrifugal spraying. Then, the formed layer is polymerized and removed from the support.

According to another aspect of the invention, several successive layers are formed in the same way by centrifugal spraying of the same reaction mixture or different reaction mixtures, in the first case to increase the thickness of said sheet and to improve its mechanical properties or, in the second case, to form a composite sheet with the desired properties.

Under an advantageous aspect of the invention, the layer obtained by centrifugal spraying is an inside protective layer (IP layer), which at the moment of its production is associated with a plastic layer having different properties, for example, a layer having energy-absorbing properties (EA layer). Thus a two-layer sheet is prepared which can be used directly for the production of safety glasses of the type described above. To make such a two-layer glass, it is possible first to form the IP layers by centrifugal spraying, then the EA layer by reactive casting as described below or in a variant the reactive spraying or, inversely, the layer having energy-absorbing properties is formed first, then the IP layer.

Preferably to avoid premature polymerization, the mixing is performed directly in the spray head.

Then the layer is formed by spraying directly on the support, the adherence of the sprayed material to the support surface should not be too high, otherwise the layer formed after polymerization cannot be detached from the support or also runs the risk of being altered during detachment. Thus, depending on the nature of the sprayed material and also that of the support, the surface of this latter can be previously treated with separation agents when the adherence is too strong. As separation agents, it is possible to use stearates, silicones, fluorohydrocarbons, paraffin, waxes, an addition product of ethylene oxide such as described, for example, in French patent 2,383,000. These same products or other suitable products can also be used when the casting support is plastic, metal, etc.

Treatment of the support surface can be done by wetting this surface with a liquid composition comprising the separation agent, followed by an evaporation of the liquid phase. Various processes can be used to apply the treating composition to the support surface. It is possible, for example, to proceed by streaming, spraying, etc.

Under another advantageous aspect of the invention, x4hen the reaction mixture is able to polymerize under the action of heat, spreading of the layer being formed can be improved by performing the spraying when the support to be coated is hot. Thus, when it is a question of forming a thermosetting polyurethane layer as described below, the best spreading is obtained when the support temperature is between about 25° C. and 60° C.

The reaction mixture used for spraying according to the invention is a mixture of two components able to form a polyurethane layer, particularly a self-healing polyurethane layer having such surface properties as resistance to scoring and abrasion.

Examples of monomers that are suitable for the preparation of these polyurethanes, on the one hand, are aliphatic difunctional isocyanates such as 1,6-hexanediisocyanate, 2,2,4-trimethyl-1,6-hexanediisocyanate, 2,2,4-trimethyl-1,6-hexanediisocyanate, 1,3-bis-(isocyanatomethyl)benzene, bis(4isocyanatocyclohexyl)methane, bis(3-methyl-4-isocyanatocyclohexyl)methane, 2,2-bis(4isocyanatocyclohexyl)propane and 3-isocyanatomethyl-3,5,5-trimethylcyclohexylisocyanate as well as biurets, isocyanurates and prepolymers of these compounds having a functionality of 3 or more and, on the other hand, polyfunctional polyols, such as branched polyols such as polyesterpolyols and polyetherpolyols obtained by reaction of polyfunctional alcohols, particularly 1,2,3-propanetriol (glycerol), 2,2-bis(-hydroxymethyl)-1-propanol (trimethylolethane), 2,2-bis(hydroxymethyl)-1-butanediol (trimethylolpropane), 1,2,4-butanediol, 1,2,6-hexanetriol, 2,2-bis(hydroxymethyl)-1,3-propanediol (pentaerythritol) and 1,2,3,4,5,6-hexanehexol (sorbitol), with aliphatic diacids, such as malonic acid, succinic acid, glutaric acid, adipic acid, suberic acid and sebacic acid or with cyclic ethers, such as ethylene oxide, 1,2-propylene oxide and tetrahydrofuran, or also polycaprolactone polyols. As the polyol component, it is also possible to use a mixture of at least a long diol such as polyesterdiol or a polyetherdiol with a molecular mass between 500 and 4000, and at least a short diol and, if necessary, at least a polyol with a functionality equal to or greater than three.

When it is desired to obtain a coating layer having improved moisture resistance properties, there can be used as the polyol component a plurifunctional polyol exhibiting ethoxy-propoxy chains, particularly a difunctional polyol comprising 5 to 17% by weight of OH radicals, with an average molecular weight between about 200 and 600 and comprising about 80% by weight of ethoxy radicals in the ethoxy-propoxy chain. This difunctional polyol goes into the polyol-isocyanate mixture at a rate of about 25 to 70% by weight of said mixture. The plurifunctional polyol can also be a polyol with a functionality greater than 2 comprising abut 0.4 to 14% by weight of OH radicals, with an average molecular weight between about 500 and 15,000 and comprising about 50 to 90% by weight of ethoxy radicals in the ethoyx-propoxy chains. This polyol goes into the polyol-isocyanate mixture at a rate of about 30 to 90% by weight of said mixture. The trifunctional polyol is preferably a polyetherpolyol with a base of trimethylolpropane or glycerol or propylene oxide, or a lactonepolyesterpolyol with a base of trimethylolpropane or glycerol or caprolactone. The polyfunctional polyol can also be a tetrafunctional polyol comprising 0.7 to 14% by weight of OH radicals, with an average molecular weight between about 500 and 10,000 and comprising about 10 to 80% by weight of ethoxy radicals in the ethoxy-propoxy chains.

High-speed centrifugal spraying according to the invention makes it possible to obtain a homogeneous reaction mixture from components with very different viscosities.

As a variant, the centrifugal spraying can be an electrostatic spraying known in the art, with the centrifugal spraying being performed in an electric field.

When a two-layer sheet is produced according to the invention, one by centrifugal spraying to form the IP layer, the other by reactive casting to form the EA layer, this second layer is formed by reactive casting of a reaction mixture of an isocyanate component and a component with active hydrogens, particularly a polyol component. If necessary, the second layer can be produced before the first IP layer. The isocyanate component entails at least an aliphatic, cycloaliphatic diisocyanate or a diisocyanate prepolymer, this component having a viscosity less than about 5000 centipoises, at +40° C., the polyol component comprising at least a difunctional long polyol with a molecular mass between 500 and 4000 and at least a short diol as a chain-lengthening agent. By reactive casting is meant casting in the form of a layer or film of a liquid mixture of the components as monomers or prepolymers, followed by a polymerization of this mixture by heat. This reactive casting which provides the layer with good mechanical and optical properties will be described more completely in the description below.

The proportions of the polyurethane components are selected preferably to obtain a stoichiometrically balanced system, i.e., the ratio of the NCO equivalent groups, which are contributed by the diisocyanate component, to the OH equivalent groups, which are contributed by the polyol component, i.e., the long polyol or polyols and the short polyol or polyols, is on the order of 1. Then the NCO/OH ratio is less than 1, and the more it decreases, the faster the mechanical properties desired for the application become unsatisfactory. When the NCO/OH ratio is greater than 1, and the more it increases, the more certain mechanical properties of the layer obtained by reactive casting can be enhanced, for example, the layer becomes stiffer. Yet, given the higher cost of the ioscyanate component in comparison with that of the glycol component, the choice of these NCO/OH ratios as approximately equal to 1 is a good compromise between the properties obtained and the cost.

The proportions between the long polyol and the short polyol can vary as a function of the desired properties and also of the ratio of the equivalent groups, the number of OH equivalent groups of the short diol, however, generally representing 20 to 70% of the total equivalent groups of the mixture forming the polyol component in the case where the ratio of NCO equivalent groups to the OH groups is on the order of 1. When the proportion of snort diol increases, the layer hardens and its modulus generally increases. Suitable diisocyanates used within the context of the invention are from the following aliphatic difunctional isocyanates: hexamethylenediisocyanate (HMDI), 2,2,4-trimethyl-6-hexanediisocyanate (TMDI), bis-4-isocyanatocyclohexylmethane (Hylene W), bis-3-methyl-4-isocyanatocyclohexylmethane, 2,2-bis(4-isocyanatocycloclohexyl)-propane, 3-isocyanatomethyl-3,5,5-trimethylcyclohexylisocyanate (IPDI), m-xylylenediisocyoanate (XDI), m- and p- tetramethylxylylenediisocyanate (m- and p-TMXDI), transcyclohexane-1,4-diisocyanate (CHDI), 1,3-(diisocyanatomethyl)cyclohexane (hydrogenated XDI). Preferably IPDI is used, particularly for reasons of cost.

Advantageously, an isocyanate component containing urea functions is used. The urea functions improve certain mechanical properties of the layer. The urea proportion can represent up to about 10% of the total weight of the isocyanate component with urea functions. Preferably the urea proportion is between 5 and 7% of the total weight of said component. For the reason mentioned above, 3-isocyanatomethyl-3,5,5-trimethylcyclohexyldiisocyanate comprising urea functions (IPDI and derivatives) is used. Suitable long polyols are selected from polyetherdiols or polyesterdiols with a molecular mass of 500–4000; the polyesterdiols being products of esterification of a diacid such as adipic, succinic, palmitic, azelaic, sebacic, ophthalic acid and a diol such as an ethylene glycol, 1,3-propanediol, 1,4-butanediol, 1,6-hexandiol, or polyetherdiols that have the general formula with n=2 to 6; and in such that the molecular mass is located in the interval of 500–4000, or the poletherdiols of the general formula H-[-$(CH_2)_n$]$_m$OH, wherein n is 2 to 6, and m is such that the molecular weight is between about 500–4000. It is also possible to use polyetherdiols having the formula:

wherein m has a molecular weight between about 500–4,000. It is also possible to use polycaprolactone diols.

A polytetramethylene glycol (n=4) with a molecular mass of 1000 is preferably used.

Suitable chain-lengthening agents are short diols with a molecular mass less than about 300 and preferably less than 150 such as: ethylene glycol, 1,2-propanediol, 1,3-propanediol, 1,2-, 1,3- 1,4-propanediol, 2,2-dimethyl, 1,3-propanediol (neopentylglycol), 1,5-pentanediol, 1,6hexanediol, 1,8-octanediol, 1,10-decanediol, 1,12dodecanediol, cyclohexanedimethanol, bisphenol A, 2-methyl-2,4-pentanediol, 3-methyl-2,4-pentanediol, 2-ethyl-1,3-hexanediol, 2,2,4-trimethyl-1,3-pentanediol, diethylene glycol, triethylene glycol, tetraethylene glycol, 2-butyne-1,4-diol, 1,4-butenediol and decanediol substituted and/or etherified, hydroquinone-bishydroxyethylether, bisphenol A etherified by two or more groups of propylene oxide, dimethylolpropionic acid. In general, the shorter the diol, the harder the layer.

Preferably 1,4-butanediol is used which is a good compromise to obtain a layer that is neither too hard nor too soft, which is desired for this type of application as an energy absorber.

The reactive casting implies a fast reaction for the layer to be formed in times compatible with industrial production. This requires a high temperature, on the order of about 100° to 140° C., a temperature as which secondary branching reactions occur, creating, for example, allophanate and/or biuret groups between the urethane chains.

Under these operating conditions, even with difunctional components, when the NCO/OH ratio is approximately equal to 1, the resulting product is not completely thermoplastic; actually it is infusible and insoluble in most of the solvents of polyurethanes such as tetrahydrofuran, and dimethylformamide. Advantage is taken of the improved mechanical properties with an equal formulation in relation to an equivalent system polymerized at lower temperature where only a linear polycondensation occurs.

When the NCO/OH ratio is less than 1 and on the order of 0.8 to 0.9, a cross-linking of the type described above occurs only in an insignificant way.

In an embodiment of the polyurethane layer having energy-absorbing properties, the polyol component can contain a slight proportion of at least a polyol with a functionality equal to or greater than three and monomeric aliphatic triols such as glycerol, trimethylolpropane, triols with polyether chains, polycaprolactone triols, the molecular mass of these triols generally being between 90 and 1000. The addition of a triol causes additional bridge bonds between the polyurethane chains and can thus further improve the cohesion of the layer.

The proportions between the long polyol, short diol and optionally the triol can vary, depending on the properties desired. Generally proportions are selected so that for a hydroxyl equivalent the long polyol represents about 0.35 to 0.45 equivalent, the short diol about 0.2 to 0.7 equivalent and the triol about 0 to 0.3 equivalent. Under these conditions, the layer exhibits the following mechanical characteristics, measured per standards Ar7NOR/NFT 46 002, 51 034, 54 108.

. stress at flow threshold at −20° C. less than or equal to 3 daN/mm2

. stress at break R at +40° C. greater than or equal to 2 daN/mm2

. elongation at break R at +20° C. between 250 and 400%

. resistance to started tear R at +20° C. greater than or equal to 8.8 dan/mm thickness.

The product can also be made by replacing a part of the polyol component with a product having various active hydrogens, such as an amine.

According to one aspect of the invention, a two-layer sheet is made, namely, an inside protective layer with a thickness of about 200 μm and a fine layer, for example on the order of 50 μm thick, essentially having adhesion properties. In this case, the inside protective layer is preferably obtained by reactive casting of the mixture of components, whereas the adhesive layer is obtained by centrifugal spraying of the reaction mixture described above to form the FA layer.

Under another aspect of the invention, a two-layer sheet, one an inside protective sheet, the other having energy-absorbing properties, is produced by centrifugal spraying of reaction mixtures suitable for each of the layers. If necessary, depending on the desired thicknesses, each of these two layers can be made by a superposition of several layers which can be called elementary layers each corresponding to a centrifugal spraying.

The support for forming the layer or sheet on which the spraying or sprayings according to the invention are performed can be a rigid glass or metal support. It can also be a flexible support stretched horizontally as described, for example, in the publication of European patent 0,038,760.

Under another aspect of the invention, the horizontal plane support on which the high-speed centrifugal spraying is performed is a stretched flexible support that can be used as one of the elements going into the composition of a multilayer sheet, which can be used as it is or by being associated with other elements.

Thus, according to the invention a composite sheet can be produced comprising a sheet of polyester, for example, particularly of ethylene glycol polyterephthalate, coated with a layer of self-healing polyurethane having such surface properties as resistance to scoring and abrasion, this layer being obtained by centrifugal spraying as indicated above.

For using this production, the process and means described in the publication of European patent 0,038,760, already cited, will advantageously be used.

As a variant, the stretched flexible support can be coated on these two faces with a layer obtained by centrifugal spraying of a reaction mixture or of. different mixtures. For this purpose, a first layer is formed on the support and after polymerization the coated support is turned over and another layer is formed on the face not coated by the first layer.

The invention also relates to a device constituting a line for production of at least a layer of high optical quality, by centrifugal spraying of a mixture of reaction components on a support from which it can be detached or, if necessary, on a support going into the composition of a composite sheet.

The production line is divided into several zones, a support treatment zone, a spraying zone and a zone for polymerization of the material supplied by spraying, and, if necessary, zones for forming a second layer, particularly by reactive casting of a mixture of the components. The production line according to the invention comprises a mobile plane support, particularly of glass, a means to treat its surface with a separation agent, at least a high-speed sprayer with revolving head, and a means for polymerization of the formed layer, the entire unit advantageously being placed in a long enclosure divided into compartments corresponding to the various zones. When it is used for production of a two-layer sheet, the device can further comprise the necessary means for producing the second layer, said means being able to be a casting head with a wide thin slit as described in French patent 2,347,170, and a means for polymerizing this second layer, these additional means being placed downstream or upstream from the means for forming the layer by centrifugal spraying, depending on whether the layer is formed by centrifugal spraying in the first or second place.

When the support goes into the composition of a composite sheet as indicated above, the production line will advantageously comprise the means described in the publication of European patent 0,038,760 already cited.

Figure 1:
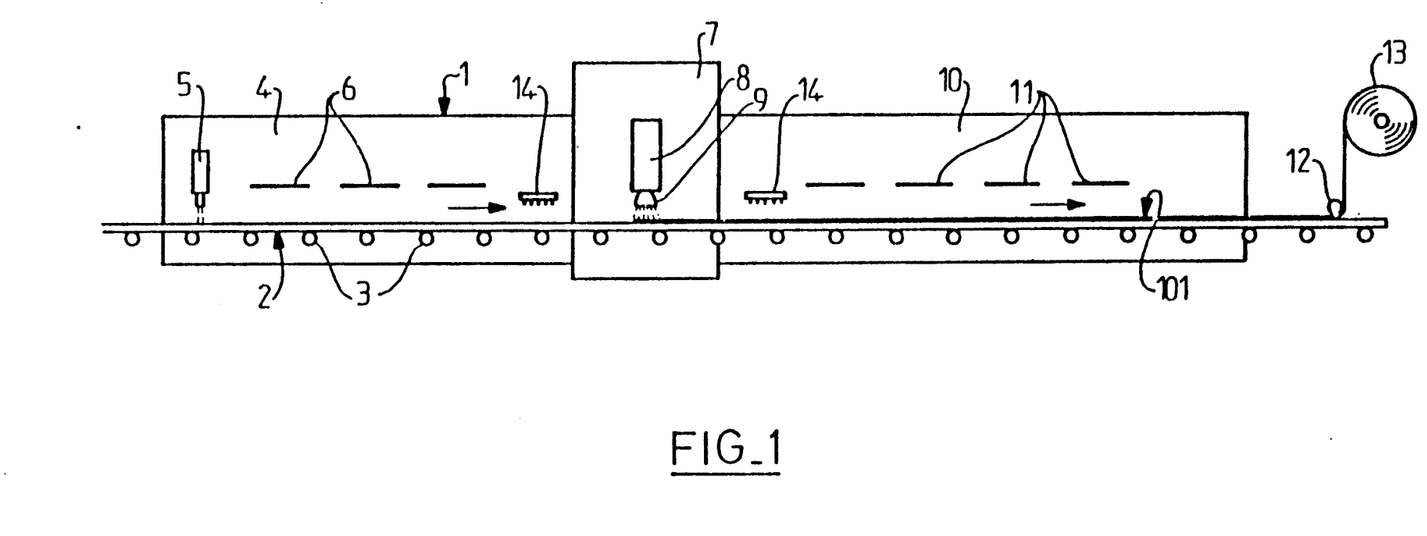
FIG. 1 illustrates a line for producing a layer of high optical quality by spraying according to the present invention.

The production line shown in FIG. 1 consists of a long enclosure 1 cut into compartments, passed through by a plane support 2 for forming the layer, the layer, for example, being a continuous strip of a succession of glass plates placed side by side, and being carried at a uniform speed by a roller conveyer 3. First, compartment 4 is equipped with a means, for the pretreatment of the glass ribbon with a separation agent. Spray gun 5 may be used for this purpose. This compartment is also equipped with heating means 6 such as resistors to bring glass ribbon 2 to the suitable temperature.

Next compartment 7 corresponds to the zone in which the layer is formed by centrifugal spraying. This compartment is equipped with a centrifugal spray means whose head 9 comprises a bowl revolving at high speed as described below. Compartment 10 placed downstream corresponds to the polymerization zone and consequently comprises means for assuring the polymerization of the layer obtained by spraying, these means, if necessary, being heating means 11 such as resistors. Downstream from the polymerization, means 12 are provided to detach layer 101 from the forming support and to wind it on reel 13.

At different places over its entire length, the line comprises means 14 to eliminate static electricity in the environment of the glass ribbon before coating. These means can be electrostatic rods known in the art.

The line can also comprise cleaning means (not shown) to eliminate dusts and other particles deposited on the glass ribbon or film.

Figure 2:
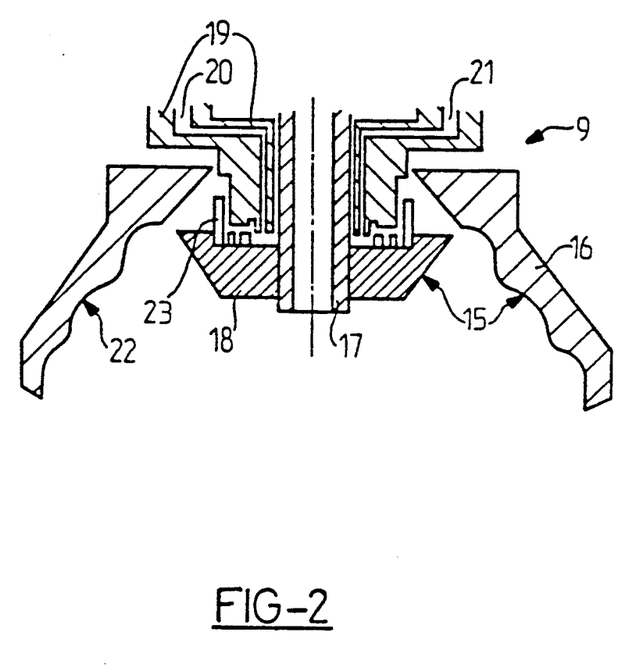
FIG. 2 shows, in section, a spray head.

Head 9 of the high-speed centrifugal spray device shown in FIG. 2 comprises a mobile part 15 consisting of revolving bowl 16 itself, solid with a chuck 17 carrying a plate 18 and a stationary part 19 pierced by two feed pipes 20, 21 for the components, these pipes coming out in the central part of the plate.

To increase the length of travel to mix the two components introduced by pipes 20, 21 and also to improve this mixing before spraying, the bowl, on the one hand, exhibits an inside surface 22 whose generatrix is undulated, and plate 18, on the other hand, carries unevennesses or ribs 23 directed upward, forming baffles.

Figure 3:
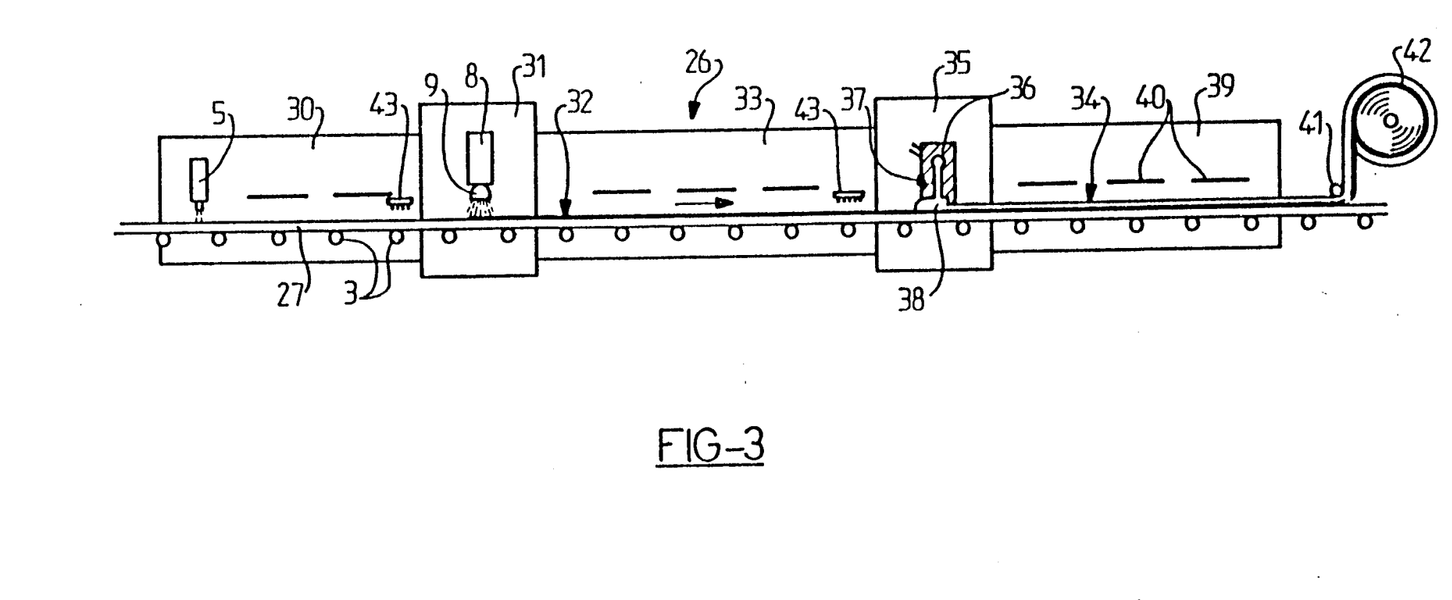
FIG. 3 illustrates a line for producing a two-layer sheet used in laminated glasses.

FIG. 3 shows a line for producing a two-layer sheet, the first layer being the layer described above, the second layer being a layer having energy- absorbing properties so that said sheet can be used directly in the production of the laminated glasses described above. This line consists of a long enclosure 26 cut into compartments, passed through by a plane support 27, for the formation of sheet 28, this support, like the device described above, being a succession of glass plates placed side by side, and being carried at uniform speed by a roller conveyer 29. The beginning of the line is identical with that described in connection with FIG. 1, i.e., it comprises particularly a first compartment 30 for previous treatment of the glass ribbon with a separation agent, a second compartment 31 corresponding to the zone for forming first layer 32 by centrifugal spraying, followed by a compartment 33 for polymerization of the formed layer. The line is further extended by compartments corresponding to the formation of second plastic layer 34 by reactive casting of a mixture of components. The first, 35, of these compartments is equipped with a casting head 36 with a wide thin slit 37 which serves for casting, in a regular and controlled way, liquid material 38 suitable for forming second layer 34. A suitable control head is, for example, that described in French patent 2,347,170. Downstream compartment 39 is equipped with means 40 for polymerization of this second layer. Means 41 are placed at the end of the production line to remove the two-layer sheet from the glass ribbon and wind it on reel 42.

Electrostatic rods 43 and cleaning means (not shown) are also provided at several places in the line to eliminate dust and other particles.

The present invention will now be further illustrated by certain examples and references which are provided for purposes of illustration only and are not intended to limit the present invention.

Example 1

In this example a layer of high optical quality is formed by using the device described in connection with FIG. 1.

Continuously passing mobile glass support 2 is coated during its passage in compartment 4 with a separation agent which, for example, can be that described in French patent 2,383,000, namely, a modified ethylene oxide product. In next compartment 7 the treated support receives a centrifugal spraying of a mixture of components with the following proportions:

1000 g of a polyether with a molecular weight of about 450 obtained by condensation of 1,2-propylene oxide with 2,2-bis(hydroxymethyl)-1-butanol and having a free hydroxyl radical content of about 10.5 to 12%, containing 1% by weight of a stabilizer, 0.05% weight of a catalyst, namely, dibutyltin dilaurate and 0.1% by weight of a spreading agent, . 1020 g of a 1,6-hexanediisocyanate biuret having a free isocyanate radical content of about 23.2%.

The polyol component exhibits a viscosity of about 620 centipoises at 25° C. while the isocyanate component exhibits a viscosity of about 2300 centipoises.

Centrifugal spraying is performed while the reaction mixture is at about 25° C., with a bowl revolving at a speed of about 20,000 rpm, the diameter of the bowl being about 90 mm. Thus, a polyurethane layer of about 100 um is formed, which is directed into the polymerization tunnel where it is polymerized by being brought to a temperature of about 100° C. for about 20 min.

The layer is removed from the glass ribbon by suitable means at the end of the line. It exhibits an excellent optical quality.

Example 2

In this example a high-quality two-layer sheet is formed by using the device described in connection with FIG. 3. The operation is the same as in example 1 for the formation of the first polyurethane layer, except its thickness is reduced to about 50 um.

After polymerization of this layer, there is cast with a casting head as described in French patent 2,347,170 a mixture of components able to form a polyurethane layer having energy-absorbing properties. For this purpose, the polyol component is previously prepared by mixing a polytetramethylene glycol with a molecular mass of 1000 (for example, the product marketed under the name Polymeg 1000 by the Quaker Oats Company), with 1,4-butanediol, the proportions of t7ne two constituents being such that the polytetramethylene glycol contributes 0.37 equivalent in hydroxyl groups while the 1,4-butanediol contributes 0.63. To the polyol component is incorporated a stabilizer at a rate of 0.5% by weight of the total mass of the polyol component and of the isocyanate component, a spreading agent at a rate of 0.05% by weight calculated in the same way and a catalyst, namely, dibutyltin dilaurate at a rate of 0.02% by weight calculated in the same way as above.

The isocyanate component used is 3-isocyanatomethyl-3,5,5-trimethylcyclohexylisocyanate (IPDI) exhibiting urea functions obtained by partial hydrolysis of the IPDI and having an NCO group content of about 31.5% by weight.

The components are taken in such amounts that the NCO/OH ratio is about 1.

After degassing of the components under vacuum, the mixture, brought to about 40° C., is poured on the polyurethane layer previously formed. Thus a layer about 0.55 mm thick is formed which in compartment 33 is subjected to a polymerization cycle consisting in minutes of heating at 120° C. at least.

The two-layer sheet is removed from the glass support and can easily be handled, stored or used immediately after for production of laminated glasses.

To produce a glass, the previously obtained two layer glass is assembled with an annealed glass sheet 2.6 mm thick. The glass can optionally be hardened or tempered. Assembly can be performed in two stages, a first stage consisting in a preliminary assembly obtained by passage of the constitutive elements of the glass between two rolls of a calender; for this purpose; it is possible to use, for example, the device described in the publication of European patent 0,015,209, the EN layer being applied against the inside face of the glass, and a second stage consisting in putting the resulting laminated product in an autoclave where it is subjected to a pressure of about 10 bar at a temperature of about 135° C. for about an hour. This autoclave cycle can optionally be replaced by an afterbake cycle without pressure.

The resulting glass exhibits an excellent optical quality and a perfect transparency and a set of mechanical properties that enable it to be used as a vehicle windshield.

The adherence obtained between the glass sheet and the layer having energy-absorbing properties is measured on the produced glass by the peeling tests described below.

A strip of the two-layer covering sheet 5 cm wide is cut out. The end of the strip on which a traction perpendicular to the surface of the glass is performed, with a traction speed of 5 cm per minute, is loosened. The operation is performed at 20° C. The average traction force necessary to make the strip come loose is noted. By operating in this way, a traction force of 10 daN/5 cm is obtained.

Impact resistance tests were made at different temperatures on the glass produced according to the example. The first unpact resistance test was made with a steel ball weighing 2.260 kg (large ball test) which was made to fall on the central part of laminated glass sample 30.5 cm square, on a rigid frame. The approximate height was determined for which 90% of the samples tested at the selected temperature resisted the ball drop without the ball going through them.

For the laminated glass according to the example the value obtained was 9 meters.

Another impact resistance test was made with a steel ball of 0.227 kg and 38 mm in diameter. The test was made at a temperature of −20° C., another test was made at +40° C. The values obtained were 11 and 13 meters respectively.

Considering European standard R 43 in force, the desired results are at least 4 meters with the Large ball, at least 8.5 meters with the small ball at −20° C. and at least 9 meters with the small ball at +40° C.

Further, the thin IP layer snows sufficient surface properties for use in a laminated glass and particularly a resistance to scoring and abrasion measured as described below:

Resistance to scoring is measured by the scoring test known under the name "Mar resistant test" which is performed with the Erichsen type 413 apparatus. A measurement is made of the charge to be carried on a diamond head to introduce a sustained scoring on the plastic layer assembled with the glass support. The charge should be greater than 20 grams for the plastic layer to have the property of being self-healing.

Resistance to abrasion is measured per European standard R 43. For this purpose, an assembled glass sample is made to undergo abrasion by an abrasive grinding wheel. After 100 abrasion revolutions, the blur difference between the abraded part and unabraded part is measured by a spectrometer. The blur deviation (blur) should be less than 4% for the layer to have anti-abrasive quality. The blur difference here is 3.5%.

The glass according to the example exhibits all the characteristics that make it suitable for use as a vehicle windshield.

Example 3

A two-layer sheet is formed, i.e., a layer 0.4 mm thick exhibiting self- healing and antilaceration properties and a layer 50 um thick exhibiting adhesion properties.

For this purpose, the operation is opposite to that described in example 2. The reaction mixture described in example 1 is cast with a casting head, and after polymerization of this layer, the reaction mixture with which the EA layer in example 2 was formed is sprayed on it. After polymerization, an adhesive layer is obtained.

The two-layer sheet is assembled with a laminated glass consisting of two sheets of glass and a polyvinylbutyral insert layer, the adhesive layer being placed in contact with the inside sheet, so that the unit can be used as a safety windshield exhibiting, among others, self-healing and antilaceration properties.

Example 4

A sheet is produced having antishattering properties, which can be used in vehicle or building glasses.

For this purpose, there is formed on a plane glass support a first layer 100 um thick by centrifugal spraying of a reaction mixture as described in example 1.

After polymerization, a second layer 100 um thick is formed on the first layer still placed on the plane support, by centrifugal spraying of the reaction mixture able to form an EA layer as described in example 2.

After polymerization of this second layer, the composite sheet is removed from the forming support and is assembled, for example, with a tempered glass sheet, the glass formed being used as a side glass for motor vehicles.

The two-layer sheet can also be assembled with a tempered or untempered glass sheet and the unit used as a building glass. In case the glass breaks, the plastic sheet holds the glass slivers.

Example 5

The operation is the same as in example 4, but to form two layers, each with a thickness of 200 um. The resulting sheet can be used as an antilacerating and selfhealing glass by being associated with a laminated glass consisting of two glass sheets and a polyvinylbutyral insert.

Example 6

An EA layer 0.4 mm thick is formed by reactive casting of the reaction mixture described in example 2 on an ethylene glycol polyterephthalate ribbon 50 mm thick which is stretched as indicated in the device described in the publication of European patent 0,038,760. After polymerization, the composite film is turned over and a layer 50 um thick is formed on it, while it is stretched in the same way, by centrifugal spraying of the reaction mixture described in example 1.

After polymerization, the resulting composite sheet can be assembled with a one-piece glass support to constitute a safety glass that can be used as a motor vehicle windshield.

Example 7

The reaction mixture described in example 2 is casted on a horizontal metal strip as described for example in the publication of European patent 0,133,112, previously coated with a separation agent, to form an EA layer 0.6 mm thick. After polymerization, the layer is detached from the support, turned over, and a second layer 50 um thick is formed on its face that was initially in contact with the support by centrifugal spraying of the reaction mixture described in example 1.

After separation from the metal forming support, the resulting sheet can be used by associating it with a single-piece glass support to form a safety glass such as a motor vehicle windshield.

Having now fully described the present invention, it will be apparent to one of ordinary skill in the art that many changes and modifications can be made thereto without departing from the spirit or scope of the invention as set forth herein.

What is claimed as new and desired to be secured by Letters Patent of the United States is:

1. A composite sheet capable of being used in laminated glasses, comprising:
    a) a flexible stretched support, and
    b) two layers of high optical quality on said support, one layer formed on one face of the support, being a thin layer resistant to scoring and abrasion, the other layer formed on the other face of the support, having energy-absorbing properties, said two layers being produced by a continuous process, which comprises:
        i) forming one of the two layers onto the flexible stretched support which is carried in a uniform horizontal movement,
        ii) turning over the support,
        iii) forming the second layer onto the second face of the flexible stretched support, and wherein the layer resistant to scoring an abrasion is formed by a high-speed centrifugal spraying of the mixture of reaction components from a bowl spray head, which components have been separately added thereto, the centrifugal spraying being performed with the bowl spray head revolving at a speed between 1,000–80,000 rpm and further wherein mixing of the reaction components is effected directly in the spray head.

2. The composite sheet of claim 1, wherein the layer resistant to scoring and abrasion has a thickness of 50–200 $\mu$m.

3. The composite sheet of claim 1, wherein the layer having energy-absorbing properties is obtained by reactive casting of a mixture of reaction components capable of forming a layer having energy-absorbing properties.

4. The composite sheet of claim 1, wherein said layer resistant to scoring and abrasion has a thickness of from about 50 to up to less than 100 $\mu$m.

5. A composite sheet capable of being used in laminated glasses, comprising:
    a) a flexible stretched support, and
    b) two layers of high optical quality on said support, one layer formed on one face of the support, being a thin layer resistant to scoring and abrasion, the other layer formed on the other face of the support, having energy-absorbing properties, said two layers being produced by a continuous process, which comprises:
        i) forming one of the two layers onto the flexible stretched support which is carried in a uniform horizontal movement,
        ii) turning over the support, and
        iii) forming the second layer onto the second face of the flexible stretched support, and wherein the layer resistant to scoring and abrasion is formed by a high-speed centrifugal spraying of the mixture of reaction components from a bowl spray head, which components have been separately added thereto, the centrifugal spraying being performed with the bowl spray head revolving at a speed between 1,000–80,000 rpm and further wherein mixing of the reaction components is effected directly in the spray head,
    provided that said flexible stretched support is made of ethylene glycol polyterephthalate.

6. A composite sheet capable of being used in laminated glasses, comprising:
    a) a flexible stretched support, and
    b) two layers of high optical quality on said support, one layer formed on one face of the support, being a thin layer resistant to scoring and abrasion, the other layer formed on the other face of the support, having energy-absorbing properties, said two layers being produced by a continuous process, which comprises:
        i) forming one of the two layers onto the flexible stretched support which is carried in a uniform horizontal movement,
        ii) turning over the support, and iii) forming the second layer onto the second face of the flexible stretched support, and wherein the layer resistant to scoring and abrasion is formed by a high-speed centrifugal spraying of the mixture of reaction components from a bowl spray head, which components have been separately added thereto, the centrifugal spraying being performed with the bowl spray head revolving at a speed between 1,000–80,000 rpm and further wherein mixing of the reaction components is effected directly in the spray head, provided that said flexible stretched support is made of polyester.

* * * * *